United States Patent [19]
Nakata et al.

[11] 3,866,488
[45] Feb. 18, 1975

[54] MANUALLY OPERATED SHIFT ASSEMBLY WITH RESTRAINING ACTION FOR SHIFTING TO REVERSE

[75] Inventors: Tadao Nakata; Hideaki Mizutani; Shinichi Ito; Mitsuhiko Okada; Nobuaki Katayama, all of Toyota, Japan

[73] Assignees: Toyota Jidosha Kogyo Kabushiki Kaisha, Toyota, Aichi-ken, Japan

[22] Filed: Oct. 29, 1973

[21] Appl. No.: 410,402

Related U.S. Application Data
[63] Continuation of Ser. No. 325,257, Jan. 22, 1973, abandoned.

[30] Foreign Application Priority Data
Jan. 24, 1972   Japan.................................. 47-8284

[52] U.S. Cl....................... 74/475, 74/476, 74/477
[51] Int. Cl. ............................ G05g 5/10, G05g 9/12
[58] Field of Search...................... 74/475, 476, 477

[56] References Cited
UNITED STATES PATENTS

| | | | |
|---|---|---|---|
| 1,831,194 | 11/1931 | Radford................................ | 74/475 |
| 1,951,876 | 3/1934 | Lapsley............................ | 74/476 X |
| 2,178,061 | 10/1939 | Bachman et al................. | 74/475 X |
| 3,043,413 | 7/1962 | McAfee et al.................... | 74/476 X |
| 3,192,788 | 7/1965 | Fodrea............................. | 74/476 X |
| 3,269,208 | 8/1966 | Whitchurn....................... | 74/476 X |

*Primary Examiner*—Allan D. Herrmann
*Attorney, Agent, or Firm*—Toren, McGready and Stanger

[57] ABSTRACT

In a manually operable shift assembly a plurality of fork shafts are arranged within a gear case and each fork shaft is axially displaceable between two different gear positions by a gearshift lever which engages a recess within the fork shaft. One of the fork shafts is axially movable between a forward gear position and a reverse gear position and the fork shaft alongside it is movable between two forward gear positions. To prevent accidental engagement in the reverse gear position when shifting into or out of its associated forward gear position a limiting or restricting action is provided which must be overcome before movement into the reverse gear position can be attained. In one embodiment, the restricting action is provided between a plate mounted on the gearshift lever and a spring biased member arranged within the gear case. In another embodiment the limiting action is provided by spring biased pins located in the recess in the fork shaft. Additionally, the shifting movement can be effected by means of an intermediate rod and lever assembly disposed between the gearshift lever and the fork shaft with the restricting action afforded between the lever on the intermediate rod and a spring biased pin positioned in the gear case at a location spaced from the fork shaft.

13 Claims, 13 Drawing Figures

MANUALLY OPERATED SHIFT ASSEMBLY WITH RESTRAINING ACTION FOR SHIFTING TO REVERSE

This is a continuation of application Ser. No. 325,257 filed Jan. 22, 1973, now abandoned.

BACKGROUND OF THE INVENTION

This invention relates to a shift assembly for a multiple forward speed transmission which includes at least one reverse speed.

Generally, shift assemblies for five-forward-speed transmissions have three selection positions for the gearshift lever, with each selection position providing two axially spaced shift positions, at the opposite ends of a straight line of the shift pattern passing through the selection position. Thus, of the three selection positions the first position leads to two shift positions for the first and second forward speeds, the second position to two shift positions for the third and fourth forward speeds, and the third position to two shift positions for the fifth forward speed and the reverse speed. Because the reverse and fifth speed positions are on the opposite ends of the same straight line through the selection position, there is the danger that, when the car is running in the fifth forward speed, the driver who for some reason attempts to downshift may accidently move the shift lever through the neutral or selection position into reverse, thereby causing the gears to clash with possible damage or shock. To prevent accidental shifting from the forward gear position into reverse, it has been proposed and practiced to design the shift assembly so that the gearshift lever must be pushed down or pulled up before shifting into reverse or the operation of the shift lever must be combined with the pressing of a special button or the like. All of those contrivances, however, have drawbacks in that they require some skill in shifting into reverse and involve very complicated mechanisms which are rather difficult for a driver to operate.

SUMMARY OF THE INVENTION

Therefore, it is a primary object of the present invention to eliminate the foregoing drawbacks by preventing the accidental shifting from forward to reverse by means of a simplified mechanism, and to improve the shift lever handling and the feel of the shifting action into reverse.

Another object of the invention is, in a transmission whose shift pattern includes a forward speed position and a reverse speed position on the same straight line, to prevent accidental movement from the forward speed position into the reverse position while the car is operating at a forward speed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

FIG. 5($a$) is a view of the transmission with the gears shifted to the fifth forward speed position;

FIG. 5($b$) is a view similar to FIG. 5($a$) with the gears shifted to the reverse position;

DESCRIPTION OF THE PREFERRED EMBODIMENTS

In the following description of the present invention various preferred embodiments are set forth either incorporated in transmissions of the type with the gearshift lever directly engaged with a fork shaft or indirectly engaged with the fork shaft through an intermediate rod and other elements.

Figure 1:
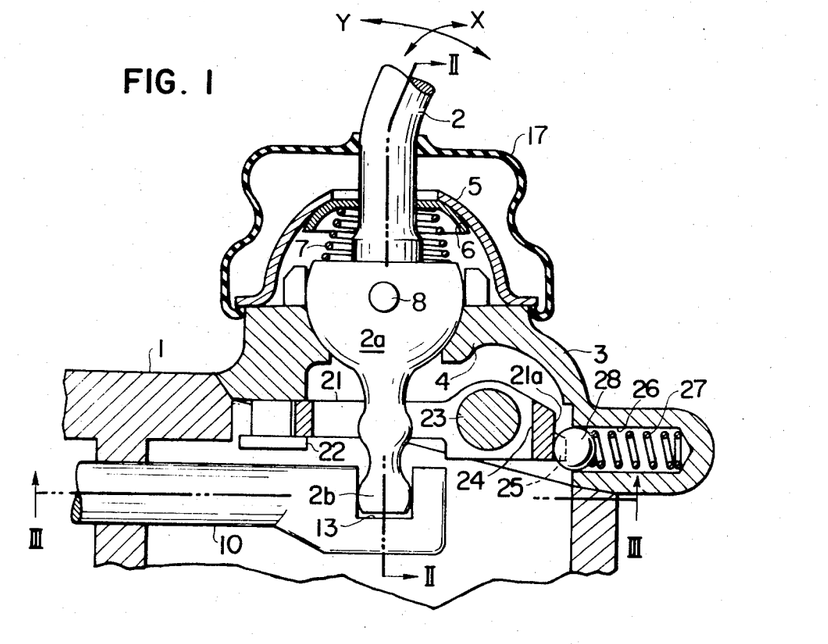
FIG. 1 is a partial view, in vertical section, of a transmission of the type wherein the shift lever directly engages a plurality of shafts, incorporating the present invention.
Figure 2:
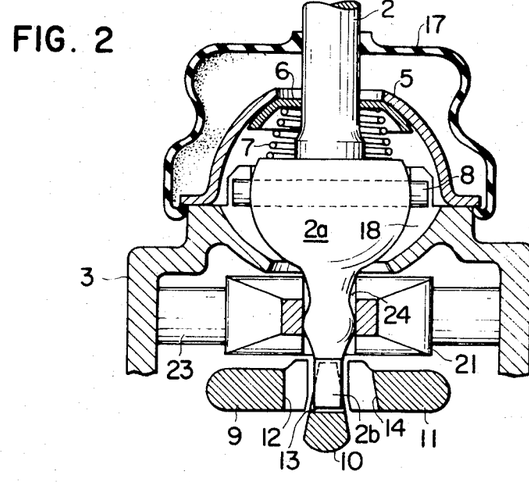
FIG. 2 is a sectional view taken on line II—II of FIG. 1.
Figure 3:
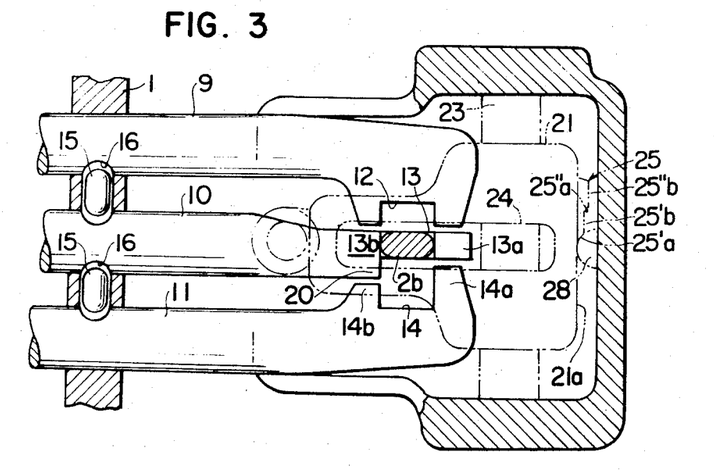
FIG. 3 is a sectional view taken on line III—III of FIG. 1.

In FIGS. 1 to 3, there is shown spring transmission of the type in which the gearshift lever directly engages with a fork shaft and in which the present invention is incorporated. Spaced from gears, not shown, in the gear case 1 is a manually operated gearshift lever 2. The lever 2 has an enlarged partly spherical portion 2$a$ intermediate its ends and the portion is in contact with a correspondingly spherically shaped seat 4 of a retainer 3 fixed to the gear case 1, and is biased against the seat 4 under a suitable pressure exerted by a srping 7 interposed between the upper flat plane surface of the portion 2$a$ and a spring seat 6 of a cap 5 secured to the retainer 3. This arrangement permits the gearshift lever 2 to be moved in two directions, in the direction X, note FIGS. 1 and 4 (the operation in this direction being hereinafter called "selecting") and in the direction Y (hereinafter called "shifting"). The portion 2$a$ is provided with a pin 8 that extends through the center of the portion 2$a$ and projects in the selecting direction of the shift lever 2, while the spherical seat 4 is formed with guides 18, as better shown in FIG. 2, to receive the projecting ends of the pin 8, so that the selecting operation of the shift lever 2 in the direction X is restricted. The cap 5 and the root portion of the shift lever 2 are covered with a boot 17 to prevent the passage of mud, water and dust into the gear case 1.

Figure 4:
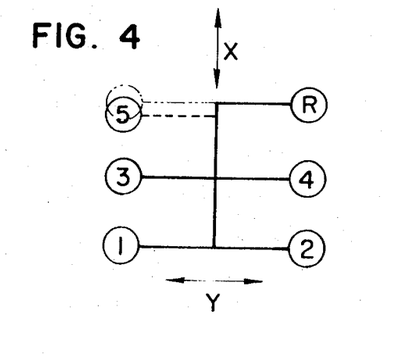
FIG. 4 is the shift pattern diagram of the transmission shown in FIG. 1.

Arranged in parallel relation within the case 1 are a plurality of fork shafts 9, 10, 11, each axially movable on the same plane. They are selectively interlocked with the shift lever 2 for shifting the intermeshing change gears according to the car speed desired. The center fork shaft 10 has a recess 13 and the side fork shafts 9, 11 each has a recess 12, 14, respectively, on the sides facing the center fork shaft, for engagement with a finger 2b on the lower end of the shift lever 2. The fork shafts are arranged so that their engaging recesses 12, 13, 14 are on a straight line extending transversely of their axial directions and, by the selecting operation of the shift lever 2 from the neutral position, its finger 2b is selectively engaged with one of the recesses. If the lever finger 2b is engaged in the recess 13, and by shifting of the lever 2, moves the fork shaft 9 to the right as viewed in FIG. 3, then the gears are placed in the first forward gear position. If the fork shaft 9 is moved from the neutral leftward, the gears are in the second gear position. Further, if the lever finger 2b is moved into engagement with the recess 13 and the fork shaft 10 is moved rightward by the shift lever 2, the gears are in the third gear position, and if the shaft is moved leftward, the gears are in the fourth gear position. Moreover, if the finger 2b is engaged with the recess 14 and the fork shaft 11 is moved to the right by the gearshift lever, the gears are in the fifth forward gear position, and if the shaft is moved to the left, the gears are in the reverse gear position. Accordingly, the shift pattern is as represented in FIG. 4. The fork shafts 9 to 11 have interlocking means, each consisting of an interlock pin 15 and a groove 16, between the adjacent shafts in pairs, i.e., between the fork shafts 9 and 10, 10 and 11. These means lock up the inoperative fork shafts as the other operative fork is moved into the shifted position by the selecting and shifting action with the lever 2.

In the transmission as described above, means are provided on the fork shafts 10 and 11, in accordance with the present invention, to restrict the shifting displacement of the fork shaft from the fifth forward gear position to any point beyond neutral. As can be seen from FIG. 3, an engaging part 13a of the recess 13 to be kept in contact with the finger 2b of the fork shaft 10 when the gears are placed in the third gear position, has approximately the same width as the finger 2b, but an engaging part 13b which contacts the finger 2b when the gears are in the forth gear position has a sidewise or lateral extension 20 projecting toward the fork shaft 11. Oppositely disposed engaging parts 14a, 14b of the recess 14 of the fork shaft 11 which contact the finger 2b when shifting to the fifth and reverse gear positions, respectively, are stepped or offset with respect to the extension 20 from the recess 13. In other words, the engaging part 14a extends laterally beyond the part 14b which provides a sufficient depth in the recess 14 to accommodate the finger 2b. The longitudinal dimension or length of the recess 14 is greater than the shift stroke of the fork shaft 10 to avoid the engaging extension 20 interfering with the engaging part 14a as the fork shaft 10 is moved during shifting.

Figure 5A:
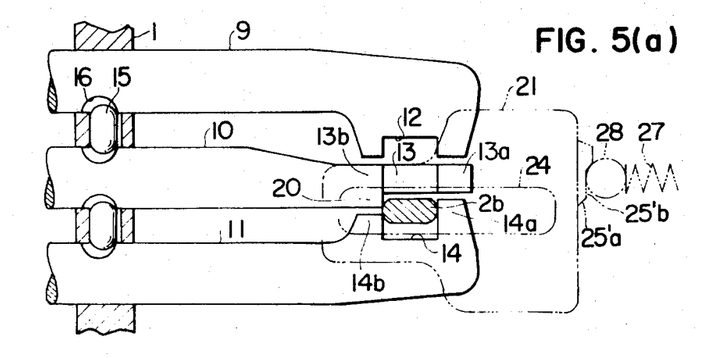
Figure 5B:
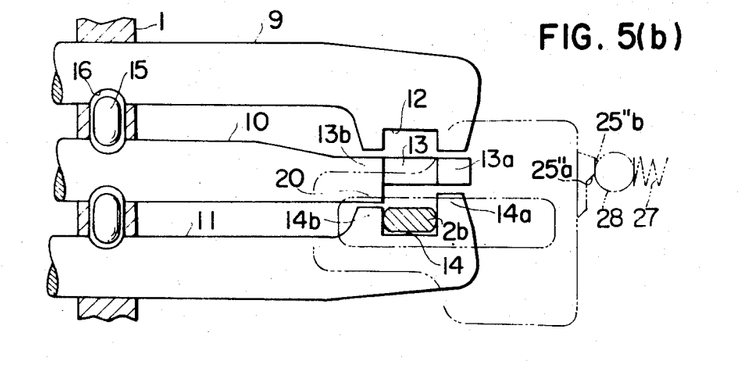

Shifting into the fifth and reverse gear positions and downshifting from fifth with the fork shafts 10, 11 will now be explained with reference to FIGS. 5(a) and 5(b). The selecting action of the shift lever 2 for shifting into the fifth gear position, brings the finger 2b partly into engagement with the recess 14 of the fork shaft 11, as shown in FIG. 5(a), with one end of the finger in contact with the engaging part 14a and the other end in contact with the engaging part 14b and the extension 20 of the fork shaft 10. In this position the fork shaft 11 can only shift into fifth. When the shift lever 2 is returned into the neutral or selection position for downshifting from fifth, an accidental shifting into reverse from neutral is prevented because the two fork shafts 10, 11 are kept inoperative by the interlock mechanism. When shifting directly into reverse, as shown in FIG. 5(b), the selection with the shift lever 2 brings the finger 2b into a position laterally displaced from the position for placing the gears in fifth, and fully into the recess 14 of the fork shaft 11 laterally spaced from the engaging extension 20 of the fork shaft 10. Consequently, the shift pattern attained in accordance with this invention includes the fifth gear position as indicated by broken lines in FIG. 4.

Selection position setting means for separately setting the selection positions for shifting into fifth and into reverse will be described in connection with two embodiments of the present invention. In the first embodiment illustrated in FIGS. 1 to 3, a horizontally arranged plate 21 is shown located between the portion 2a and the finger 2b on the lower end of the shift lever 2. The plate 21 is supported at one end in the shifting (Y) direction by a set bolt 22 which is held in the retainer 3. Near its other end the plate 21 has a hole so that it is slidably supported by a shaft 23 extended in the selecting (X) direction between the side walls of the retainer 3. In addition to this, the plate 21 has a slot 24 in the center for engagement with the shift lever 2 in the shifting direction and has a length approximately equal to the shifting stroke of the lever, so that the plate rocks sidewise with the shift lever 2 only when the lever is operated for selecting gears. Further, the plate 21 has an integral stepped projection 25 extending outwardly from its end face 21a toward the adjacent wall of the retainer 3. A ball 28, partly accommodated in a recess 26 of the retainer 3, is urged by a spring 27 into contact with the projection 25. As shown in FIG. 3, the projection 25 has an inclined plane 25a' and a flat plane 25b' of a desired height in continuation from the end face 21a over the range where the plate 21 can slide on the shaft 23 with the shift lever 2 from the selection position where the gears are placed in the third or fourth gear position into the selection position where the gears are shifted to the fifth gear position. The projection 25 is also formed with a second inclined plane 25a'' and a higher flat plane 25b'' that is one closer to the adjacent retainer wall in continuation from the plane 25b' over the range where the plate 21 can rock with the lever from the selection position for shifting to the fifth gear position to the selection position for shifting into reverse. The ball 28 is located in the shifting direction of the selection position where the gears can be placed in either the third or fourth.

When shifting into the fifth gear position, as shown in FIG. 5(a), the projection 25 of the plate 21 that rocks with the selecting operation of the shift lever 2 allows the ball 28 to roll onto the flat plane 25b' via the inclined plane 25a' while pressing the spring 27 backward. Thus, with the ball 28 positioned in the border between the flat plane 25b' and the second inclined plane 25a'', the selection position of the shift lever 2 is fixed. When shifting into reverse, as shown in FIG. 5(b), the projection 25 causes the ball 28 to roll farther onto the flat plane 25b'' via the inclined plane 25a'' while urging the spring 27 farther backward. The selection position of the shift lever 2 is fixed with the ball 28 riding on the second flat plane 25b''. In the selecting operation, therefore, the driver learns that the selection position for the fifth gear position has been reached when he or she feels the restraining or limiting action afforded by the inclined plane 25a'. Similarly, the driver can learn the selection for the reverse gear position from the second limiting effect provided by the inclined plane 25a''. It is also possible to set the selection position so that, until the selection position for the fifth gear position has been reached, the end face 21a of the plate 21 is in contact with the ball 28 and it provides resistance only when moving into the selection position for reverse.

Figure 6:
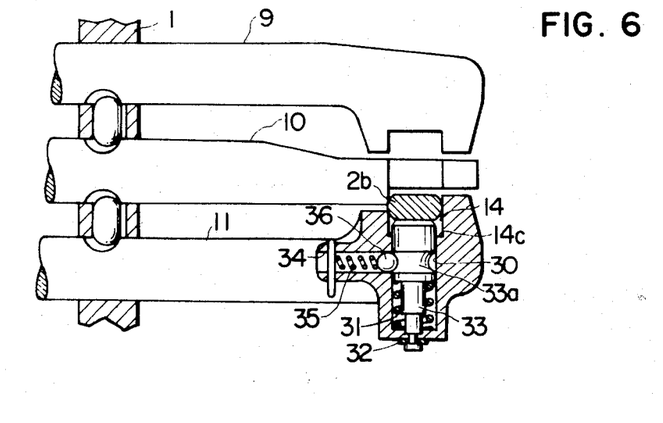
FIG. 6 is a partial sectional view, similar to FIGS. 5($a$) and 5($b$), of another embodiment of the present invention.
Figure 7:
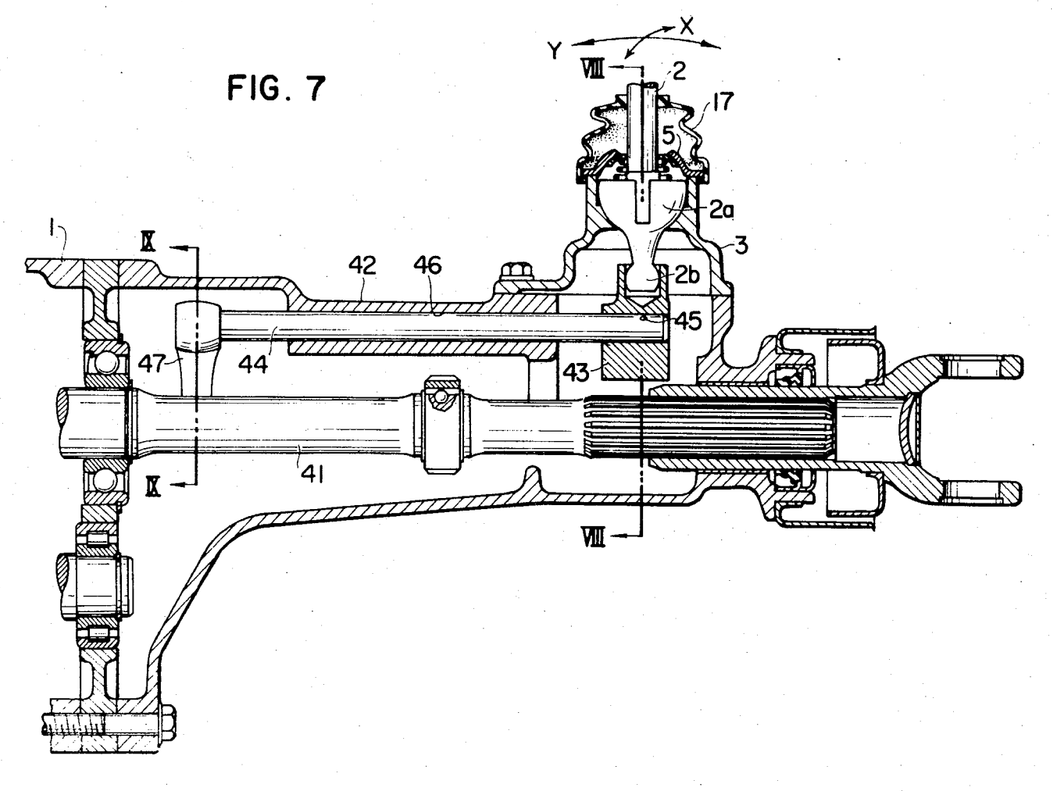
FIG. 7 is a partial view in vertical section of another type of transmission with the shift lever indirectly engaged with a plurality of fork shafts via an intermediate rod and other elements, incorporating the present invention.

In the second embodiment of selection position setting means of the invention shown in FIG. 6, the fork shaft 11 has a hole 30 extending in the selecting (X) direction at the bottom 14c of the engaging recess 14. A spring 31 is positioned in the hole 30 and biases a pin 33 toward the other fork shafts. The pin slides in the hole 30 and its passage through the hole is restricted by a stop washer 32. A concave annular groove 33a is formed in an intermediate portion of the pin 33. The fork shaft 11 also has, in the part opposite to the concave part 33a of the pin 33, a small hole 34 in communication with the hole 30. The small hole 34 contains a ball 36 loaded by a spring 35 into contact with the concave part 33a. When the shift lever 2 is moved into the selection position for the fifth gear position, the selection position is fixed as the pin 33 contacts the side of the finger 2b facing the base of the recess 14. When a certain force is applied to the shift lever 2 in the same selecting direction and the ball 36 is pushed into the hole 34 by the finger 2b it presses the pin 33 downwardly into the recess 14, the finger 2b seats only in the recess 14, thus fixing the selection process for the reverse.

As has been described above, the present invention completely precludes the danger of an accidental shifting into the reverse gear position when downshifting from fifth in a transmission of the type wherein the shift lever 2 directly engages the fork shafts 9 to 11. Moreover, when shifting into reverse, there is no necessity of operating any device other than the shift lever 2 and, therefore, the handling of the lever and its feel during downshifting are remarkably improved. The simplified construction with a limited number of parts contributes to enhanced reliability and reduced manufacturing cost.

FIGS. 7 to 10 show a transmission of the type in which the shift lever is indirectly engaged with one of the fork shafts through an intermediate rod and other elements and in which the present invention is incorporated. In these figures, an extension housing 42 containing an output shaft 41 is provided on the gear case 1 which accommodates change gears, not shown. A retainer 3 is secured to the housing 42 to permit the movement of the shift lever 2 for selecting operation in the X direction and for shifting operation in the Y direction in the same manner as in the embodiment described above. The finger 2b at the lower end of the shift lever 2 fits into a housing 43. One end of an intermediate rod 44 is fixed to the housing 43 with a pin 45. The intermediate rod 44 is slidably and rotatably inserted into a hole 46 formed in the extension housing 42 and extends toward the gear case 1. Fixed to the other end of the intermediate rod 44 is one end of a lever 47, so that the selecting and shifting operations of the shift lever 2 can be transmitted to the lever 47 in terms of a rotating or axial movement through the housing 43 and the intermediate rod 44. In the range of movement for the lever 47 are three axially displaceable fork shafts 9 to 11 extending from the gear case 1. A finger 47a located at the end of the lever 47 spaced from the intermediate rod is selectively engaged with one of recesses 12 to 14, respectively, of the fork shafts 9 to 11. Thus depending upon the selecting operation of the shift lever 2, the finger 47a at the front end of the lever 47 is engaged with a selected one of the engaging recesses. Next, by shifting with the shift lever 2, the fork shaft whose engaging recess is engaged with the finger 47a is moved in the shifting (Y) direction, so that, in accordance with the shift pattern given in FIG. 4, the gears are placed in one of the forward gear positions, the first to the fifth, or in the reverse gear position. It should be appreciated that, although not shown, interlocking means between the fork shafts are also provided in the embodiment described.

Figure 8:
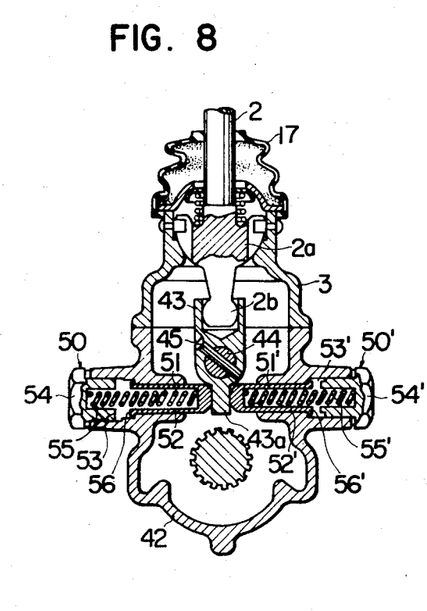
FIG. 8 is a sectional view taken on line VIII—III of FIG. 7.
Figure 9:
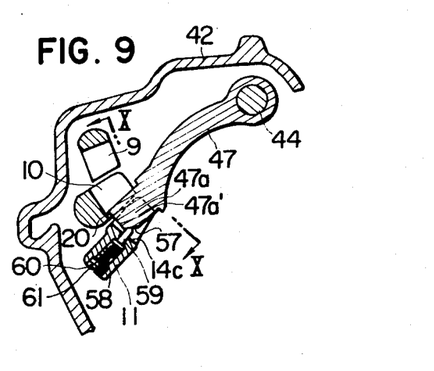
FIG. 9 is a sectional view taken on line IX—IX of FIG. 7.

In addition, this embodiment has two select return devices 50, 50' on each side of a projection 43a formed downwardly on the housing 43. The select return devices 50, 50' comprise, as shown in FIG. 8, pins 52, 52' inserted into holes 51, 51' of the extension housing 42, in such a manner as to be freely movable in the selecting direction of the gearshift lever 2, and are kept at their ends projecting from the holes in contact with the projection 43a, bolts 54, 54' screwed by means of stoppers 53, 53' into the holes 51, 51', springs 55, 55' interposed between the pins 52, 52' and bolts 54, 54', respectively, and flanges 56, 56' are formed on the pins 52, 52' to limit the amounts of movement of the pins 52, 52' toward the center therebetween with respect to the steps of the holes 51, 51', and also to limit the amounts of outward movements of the pins 52, 52' relative to the stoppers 53, 53'. While the shift lever 2 is in neutral free to move in the selecting (X) direction, the projection 43a is positioned in the center by the two pins 52, 52' which are spring biased and are limited in amounts of their movements, so that the shift lever 2 is held, together with the housing 43, in the selection position in the center for shifting into the third and fourth gear positions, usually the gear positions most frequently occupied by the lever. When the shift lever 2 is shifted laterally from neutral to either the right or left selection position, the flange 56 or 56' is engaged with the stopper 53 or 53' to keep the selecting movement constant.

Figure 10:
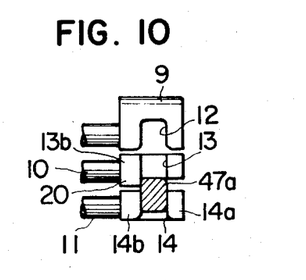
FIG. 10 is a sectional view taken on line X—X of FIG. 9.

In this shift assembly, the fork shaft 10 is provided with means similar to those incorporated in the first embodiment of the invention for restricting the movement from the fifth gear position beyond the neutral position. As shown in FIG. 10, an engaging part 13b of recess 13 of the fork shaft 10 is kept in contact with the finger at the lower end of the shift lever when the latter is shifted to the fourth gear position and it is formed with a lateral extension 20 similar to the one in the preceding embodiment. Here, because the longitudinal dimension of the engaging recess 14 of the fork shaft 11 is shorter than the shift stroke, the engaging part 14a is given the same height as the engaging part 14b to prevent the extension 20 from interfering with the engaging part 14a when the gears are placed in the third gear position by the fork shaft 10.

The selection position setting means in this shift assembly is illustrated in three forms embodying the present invention. In one form shown in FIG. 9, the end face 47a of the finger 47a at the free end of the lever 47 is formed with a step 57, whereas the bottom 14c of the engaging recess 14 of the fork shaft 11 is formed with a hole 58, in which a pin 59 limited in its amount of protrusion into the engaging recess 14 is accommodated via a bolt 60 and a spring 61. Movement of the shift lever 2 to the selection position for shifting to the fifth or reverse gear positions, rocks the lever 47 and brings its step 57 into contact with the pin 59, so that the finger 47a is located between the recess 14 of the fork shaft 11 and the extension 20 of the fork shaft 10, thus fixing the selection position for the fifth gear position. In this way, as in the previous embodiment of the invention, the fifth gear position is attained without any danger of accidental shifting into reverse. When force is applied at this time to the shift lever 2 in the selecting direction and the pin 59 is caused to ride on the end face 47a' to fix the selecting position farther outward, the finger 47a is released from the extension 20 into engagement solely with the recess 14, thus achieving the selection position for shifting to reverse. Consequently, the shift pattern obtained in this case is such that, just in the same way as in the previous embodiment, the fifth gear position is as indicated by broken lines in FIG. 4.

Figure 11:
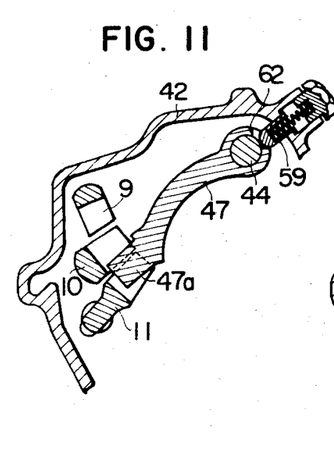
FIG. 11 is a partial sectional view, similar to FIG. 9, of still another embodiment of the present invention.
Figure 12:
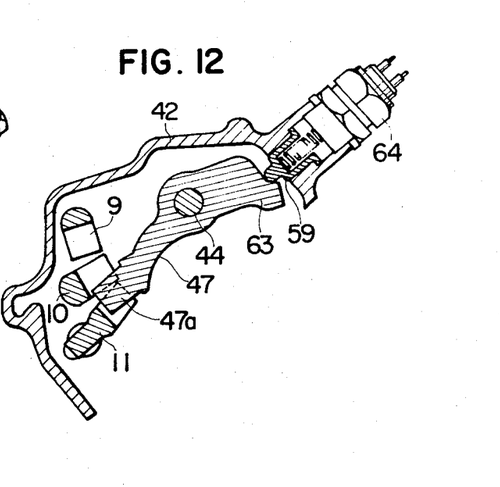
FIG. 12 is a partial sectional view, similar to FIG. 11, illustrating yet another embodiment of the present invention.

In the second form shown in FIG. 11, the end portion of the lever 47 secured to the intermediate rod 44 has a cutaway part 62 in engagement with a spring biased pin 59 so that it is movable into and out of the cutaway, as in the first form of arrangement, for fixing the selection position for shifting to the fifth or reverse gear positions. In the third form shown in FIG. 12, a projection 63 is formed on the side of the lever 47 opposite to the finger 47a. This projection 63 is engaged with a pin 59 similar to the one in the first form of the selection position setting means. In this case, the backward movement of the pin 59 at the time of selection for the shifting into reverse is used for turning on a back lamp switch 64.

As has been described above, the present invention makes it possible to preclude any accidental shifting to reverse when downshifting from fifth in a transmission of the type wherein the shift lever 2 is indirectly engaged with one of the fork shafts 9 to 11 via an intermediate rod 44 and a lever 47. Moreover, the operability of the shift lever for shifting to reverse is improved and the shift assembly as a whole is simplified in construction. While the present invention has been described as applied to transmissions for automobiles and other vehicles, it should, of course, be understood possible to apply the invention to other transmissions as well as to the transmissions other than the five-speeds-forward-and-one-speed-reverse type.

While specific embodiments of the invention have been shown and described in detail to illustrate the application of the inventive principles, it will be understood that the invention may be embodied otherwise without departing from such principles.

What is claimed is:

1. In a transmission including a gear case arranged to contain change gears, at least two fork shaft positioned within said gear case in side-by-side relationship and each arranged to be axially displaceable in the opposite directions from a neutral position for effecting a speed change in the change gears, each said fork shaft having a recess with the recesses arranged in side-by-side relationship in the neutral position, manually operable first means mounted in said gear case and arranged for selective engagement within said recesses in said fork shaft for selecting one of said fork shafts in the neutral position for shifting from the neutral position in the axial direction of the selected fork shaft for changing gears, wherein the improvement comprises interlocking means for preventing said two fork shafts from being axially displaced at the same time, a first one of said two fork shafts providing a forward gear position and a reverse gear position disposed in spaced relationship in the axial direction of the shaft on the opposite sides of the neutral position thereof, the second one of said two fork shafts providing two forward gear positions arranged in spaced relationship in the axial direction of the fork shaft on the opposite sides of the neutral position, said recess in said first fork shaft having a pari of opposed sides spaced apart in the axial displacing direction with one side located closer to the reverse gear position and the other side located closer to the forward gear position, said recess in said second fork shaft having a pair of opposed sides spaced apart in the axially displacing direction with one of said sides thereof aligned in the neutral position with the reverse shift position side of the recess in said first fork shaft when it is in the neutral position, said one of said sides extending toward the recess in said first fork shaft beyond the end of the other said side thereof closer to the recess in said first fork shaft, second means in operative association with said first means for affording a limitation on the movement of said first means from the recess in said second fork shaft into the recess in said first fork shaft so that in addition to the effort required for axial displacement needed for movement from the neutral position into the forward gear position of said first fork shaft at least one restricting action is provided to be overcome for displacing said first means for shifting from the neutral position to the reverse gear position of said first fork shaft, and the restricting action of said second means limiting the displacement of said first means into the recess in said first fork shaft so that said first means contacts said extension on the one said side of the recess in said second fork shaft and said interlocking means operates to prevent said first fork shaft from being displaced into the reverse gear position until the restricting action is overcome and said first means is moved out of contact with said extension.

2. In a transmission, as set forth in claim 1, wherein a select return device is provided for keeping said first means in engagement with the recess in said second fork shaft in the neutral position.

3. In a transmission, as set forth in claim 1, wherein said first means comprises a gearshift lever, said second means includes a plate positioned within said gear case and mounted on said gearshift lever for displacement with said gearshift lever in the selecting action, and a restricting means mounted in said gear case and disposed in a contacting engagement with and in the path of movement of said plate as it is moved by said gearshift lever from the recess in said second fork shaft to the recess in said first fork shaft.

4. In a transmission, as set forth in claim 3, wherein said plate includes a projection thereon facing toward and disposed in contact with said restricting means as said gearshift lever is moved from said recess in said second fork shaft to said recess in said first fork shaft, and said restricting means includes a ball spring biased into contact with said plate.

5. In a transmission, as set forth in claim 4, wherein said projection on said plate comprises a first step extending outwardly from said plate toward said restricting means and a second step extending from said first step and projecting from said first step toward said restricting means so that the end of said plate from which said projection extends and the side of said first step extending from said plate contacts said ball as said second fork shaft is in the neutral position and said first step provides the first restricting action to be overcome for displacement of said first said fork shaft for achieving the forward gear position and the surface of said first step and the side of said second step projecting from said first step toward said restricting means provides the second restricting action to be overcome for displacement of said first fork shaft for achieving the reverse gear position from the neutral position after overcoming the first restricting action.

6. In a transmission, as set forth in claim 1, wherein said first means comprises a gearshift lever having a finger at its end arranged to engage selectively into the recesses in said fork shafts and said second means comprising a spring biased pin mounted in the recess of said first fork shaft and arranged to be displaced against the spring bias in the direction of movement from the recess in said second fork shaft into the recess in said first fork shaft, said pin having an end surface which has a first position arranged to contact said finger of said gearshift in position for shifting said first fork shaft into the forward gear position and a second position displaced in the direction between the recesses for shifting said first fork shaft into the reverse gear position with said pin being displaced against the spring bias thereon for movement from the first to the second position.

7. In a transmission, as set forth in claim 6, wherein a spring biased ball is mounted in said first fork shaft, and said pin having a recess in the side thereof arranged to receive the spring biased ball for holding said pin in the first position.

8. In a transmission, as set forth in claim 1, wherein said first means comprises a gearshift lever having a manually operable handle portion accessible on the exterior of said gear case and a finger portion spaced from said handle portion and located within said gear case, a housing positioned within said gear case and secured to said finger portion and displaceable with said gearshift lever, an intermediate rod fixed at one end to said housing and extending therefrom through said gear case transversely of the direction of said gearshift lever, a lever fixed to said intermediate rod at a position spaced axially along said intermediate rod from said housing, said lever displaceable with said intermediate rod in response to the displacement of said housing by said gearshift lever, and said lever being displaceable between said recesses in said fork shafts.

9. In a transmission, as set forth in claim 8, wherein a select return device is mounted in said gear case and is arranged in contact with said housing for biasing said housing into the neutral position of said gearshift lever, said select return device comprises a pair of spring biased pins mounted in said gear case and disposed in contact with opposite sides of said housing and arranged to return said housing to the neutral position.

10. In a transmission, as set forth in claim 8, wherein said second means comprises a spring biased pin mounted in the recess of said first fork shaft and biased into the path of said lever of said intermediate rod as it moves into said recess so that said pin affords the restricting action required to be overcome for achieving the reverse gear position of said first fork shaft.

11. In a transmission, as set forth in claim 8, wherein said second means comprises a spring biased pin mounted in said gear case and extending into contacting engagement with said lever at a position on said lever spaced from the portion thereof engageable within the recesses in said fork shafts, and the portion of said lever contacting said pin arranged to provide the restricting action required to be overcome for achieving the reverse gear position of said first fork shaft.

12. In a transmission, as set forth in claim 11, wherein the portion of said lever contacting said pin comprises a cam-like surface arranged in the path of said pin.

13. In a transmission, as set forth in claim 11, wherein the portion of said lever contacting said pin comprises a recess in said lever with the end of the recess arranged to contact said pin when said first fork shaft is in the neutral position for movement into the reverse gear position.

* * * * *